(12) United States Patent
Tabatowski-Bush et al.

(10) Patent No.: US 11,715,848 B2
(45) Date of Patent: Aug. 1, 2023

(54) BATTERY SENSING MODULE WITH TEMPERATURE SENSOR SELECTIVE DISCONNECT

(71) Applicant: Ford Global Technologies, LLC, Dearborn, MI (US)

(72) Inventors: Benjamin A. Tabatowski-Bush, Ann Arbor, MI (US); Baojin Wang, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 236 days.

(21) Appl. No.: 17/332,754

(22) Filed: May 27, 2021

(65) Prior Publication Data

US 2022/0384865 A1    Dec. 1, 2022

(51) Int. Cl.
*H02M 1/084* (2006.01)
*H01M 10/48* (2006.01)
*H02J 7/00* (2006.01)
*H01M 10/44* (2006.01)
*H01M 10/42* (2006.01)

(52) U.S. Cl.
CPC ....... *H01M 10/486* (2013.01); *H01M 10/425* (2013.01); *H01M 10/441* (2013.01); *H01M 10/443* (2013.01); *H01M 10/482* (2013.01); *H02J 7/0013* (2013.01); *H01M 2010/4271* (2013.01); *H01M 2220/20* (2013.01)

(58) Field of Classification Search
CPC ............ H01M 10/441; H01M 10/443; H01M 10/482; H01M 2010/4271; H01M 2220/20
See application file for complete search history.

(56) References Cited

U.S. PATENT DOCUMENTS

| | | | |
|---|---|---|---|
| 8,922,165 B2 | 12/2014 | Bills | |
| 9,746,525 B2 | 8/2017 | Kudo et al. | |
| 2012/0297992 A1* | 11/2012 | Oakes | A01F 15/106 100/70 R |
| 2016/0175968 A1* | 6/2016 | Madsen | H02M 1/4225 219/130.21 |
| 2019/0267888 A1* | 8/2019 | Ge | H02M 3/158 |
| 2020/0011934 A1 | 1/2020 | Tabatowski-Bush et al. | |

FOREIGN PATENT DOCUMENTS

JP        6595063 B2     10/2019

* cited by examiner

*Primary Examiner* — Muhammad S Islam
(74) *Attorney, Agent, or Firm* — David B. Kelley; Brooks Kushman P.C.

(57) ABSTRACT

A battery pack sensing module includes a temperature sensor input connected with a battery cell temperature sensor, an integrated circuit, and a field effect transistor connected between the temperature sensor input and the integrated circuit, and having a gate that selectively opens based on a voltage on the temperature sensor input.

18 Claims, 2 Drawing Sheets

BATTERY SENSING MODULE WITH TEMPERATURE SENSOR SELECTIVE DISCONNECT

TECHNICAL FIELD

This disclosure relates to automotive battery systems and related measurement circuits.

BACKGROUND

An alternatively powered vehicle may include a traction battery arranged to provide power to an electric machine. The electric machine may transform electrical energy from the traction battery to mechanical energy to move wheels of the vehicle. The electric machine may also transform mechanical energy from the wheels to electrical energy for storage in the traction battery.

Battery state information may be useful for implementing battery pack charge and discharge control strategies. Current, voltage, and temperature data are examples of such battery state information.

SUMMARY

A traction battery system includes an array of battery cells, a temperature sensor that senses temperature of at least some of the battery cells, and a battery pack sensing module. The battery pack sensing module includes a temperature sensor input connected with the temperature sensor, an integrated circuit that provides a selectable test current to the temperature sensor via the temperature sensor input, and a switch that disconnects the temperature sensor input from the integrated circuit responsive to a voltage on the temperature sensor input exceeding a predefined value.

A battery pack sensing module includes a temperature sensor input connected with a battery cell temperature sensor, an integrated circuit, and a field effect transistor connected between the temperature sensor input and the integrated circuit, and having a gate that selectively opens based on a voltage on the temperature sensor input.

A vehicle includes an electric machine and a traction battery system. That traction battery system provides power to the electric machine, and includes a temperature sensor and an integrated circuit. The integrated circuit includes a plurality of current sources that each selectively provide a test current to the temperature sensor, and a switch that disconnects the temperature sensor from the integrated circuit responsive to a voltage associated with the temperature sensor exceeding a predefined value.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
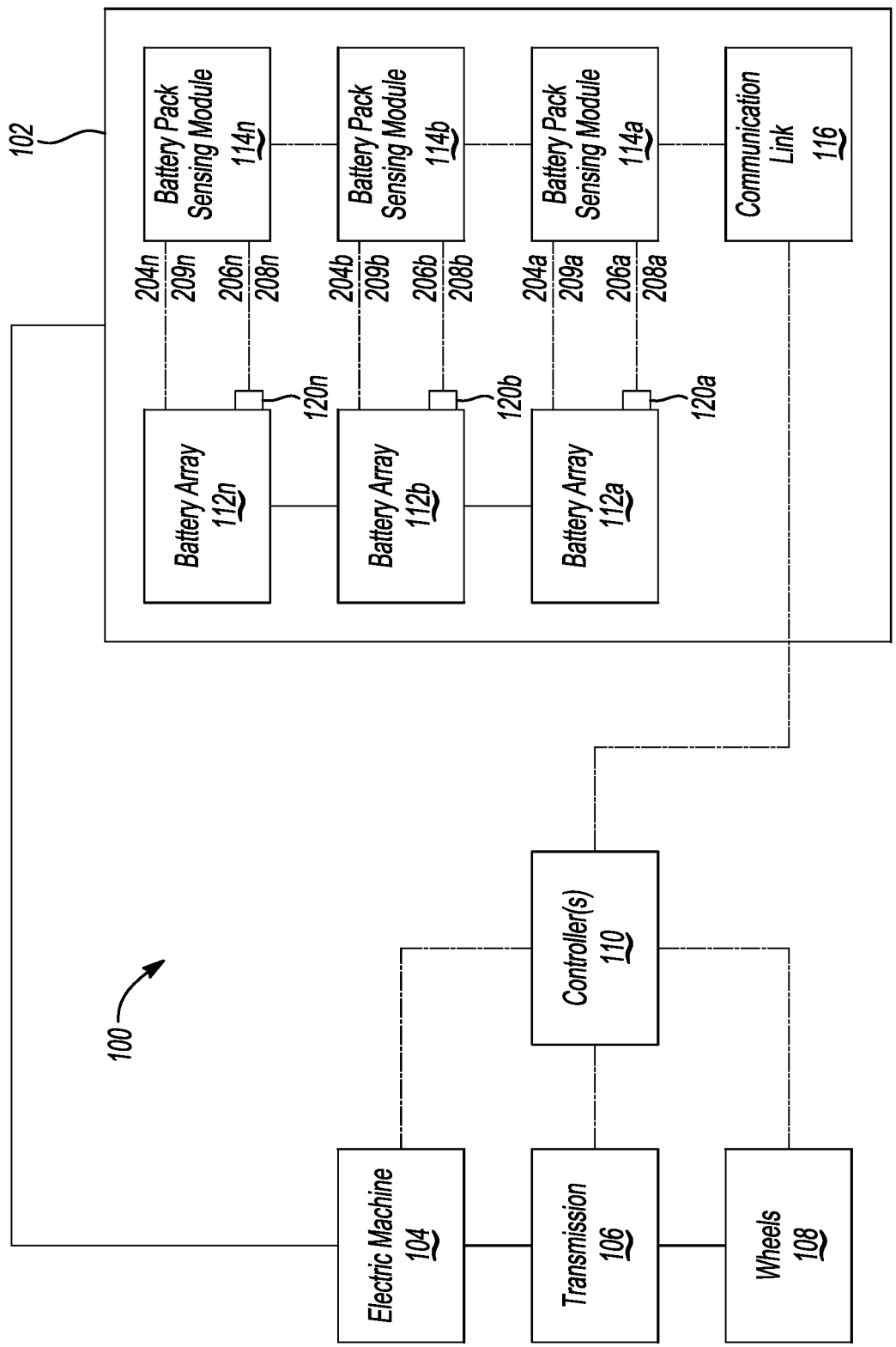
FIG. 1 is a schematic diagram of a vehicle.

Referring to FIG. 1, a vehicle 100 includes a traction battery 102, an electric machine 104, a transmission 106, wheels 108, and one or more controllers 110. The traction battery 102, electric machine 104, transmission 106, and wheels 108 are in communication with and/or under the control of the one or more controllers 110. Electrical power from the traction battery 102 is selectively provided to the electric machine 104. The electric machine 104 consumes the electrical power to generate mechanical torque that is transferred to the transmission 106, and then the wheels 108. Likewise, the wheels 108, during regenerative braking, may transfer mechanical torque to the transmission 16, and then the electric machine 104. The electric machine 104 consumes the mechanical power to generate electrical power for storage in the traction battery 102.

The traction battery 102 includes a plurality of battery cell arrays 112a-112n electrically connected in series, a plurality of battery pack sensing modules (BPSMs) 114a-114n, a communication link 116, and a plurality of temperature sensors (e.g., thermistors, etc.) 120a-120n. Each of the temperature sensors 120a-120n is operatively arranged with a corresponding one of the battery cell arrays 112a-112n. And each of the BPSMs 114a-114n is operatively arranged with a corresponding one of the temperature sensors 120a-120n. That is, the BPSM 114a is arranged to perform various sensing operations (e.g., voltage, temperature, etc.) on at least some of the battery cells of the battery cell array 112a, the BPSM 114n is arranged to perform various sensing operations on at least some of the battery cells of the battery cells array 112n, etc.

Communication between the BPSMs 114a-114n and the one or more controllers 110 is facilitated by the communication link 116. Commands to measure temperature or voltage generated by the one or more controllers 110 for the BPSMs 114a-114n thus pass through the communication link 116. The BPSMs 114a-114n, in this example, are daisy-chained together such that commands from the one or more controllers 110 are propagated sequentially from one of the BPSMs 114a-114n to another of the BPSMs 114a-114n (e.g., 114a to 114b). Likewise, data collected from any one of the battery pack sensing modules 114a-114n is propagated the other way in a similar fashion (e.g., 114b to 114a) before reaching the communication link 116 for delivery to the one or more controllers 110. The one or more controllers 110, in this example, are shown outside the traction battery 102. In other examples, at least one of the one or more controllers 110 may be integrated with the traction battery 102, etc.

Figure 2:
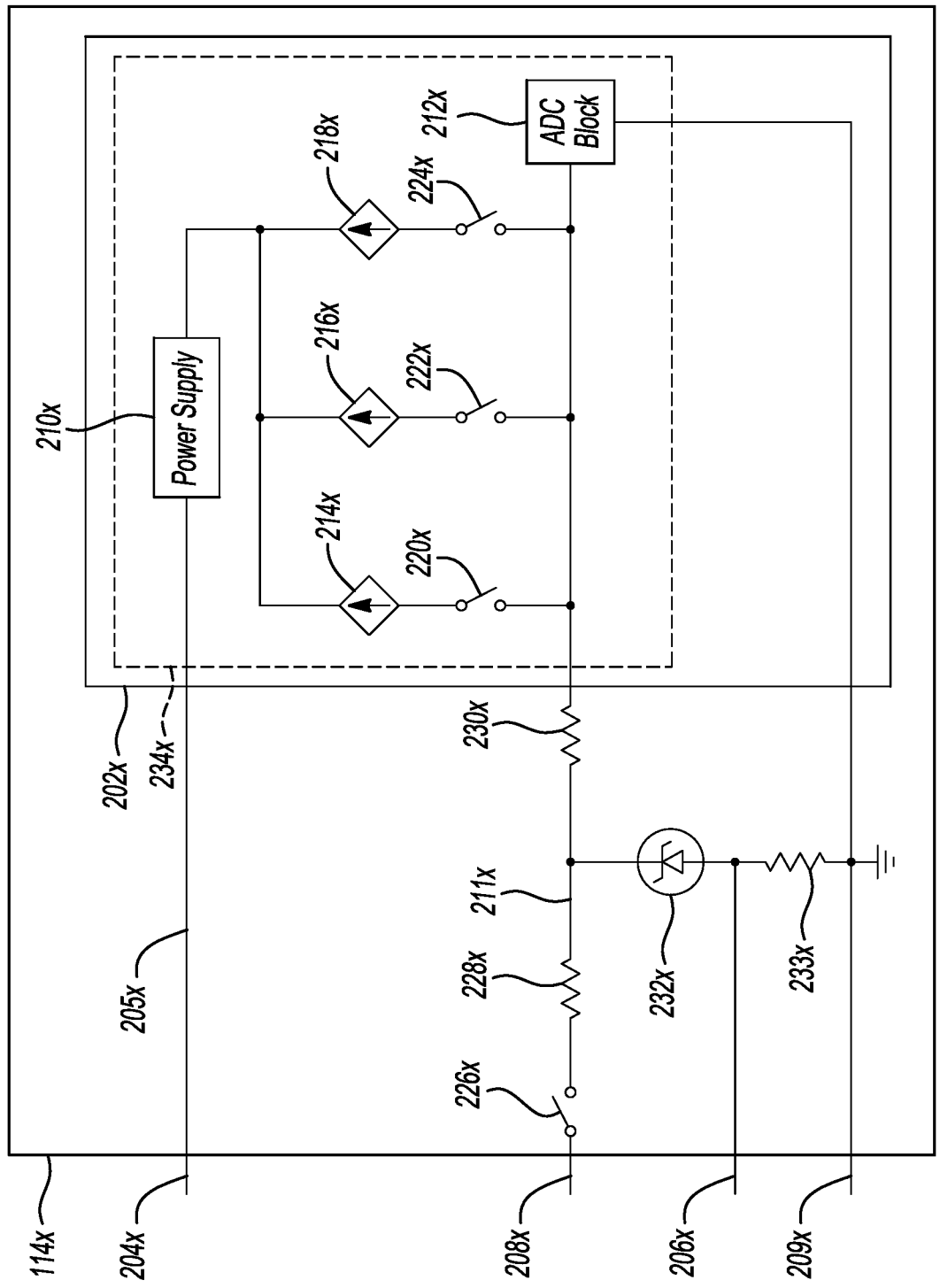
FIG. 2 is a schematic diagram of one of the battery pack sensing modules of FIG. 1.

Referring to FIG. 2, each of the BPSMs 114x includes a battery monitoring integrated circuit (BMIC) 202x, a power pin input 204x, a thermistor reference input 206x, a thermistor input 208x, and a ground reference input 209x. The BMIC 202x includes a power supply 210x, an analog to digital converter 212x, current sources 214x, 216x, 218x, and switches 220x, 222x, 224x. The current source 214x and switch 220x are in series, the current source 216x and switch 222$x$ are in series, and the current source 218$x$ and switch 224$x$ are in series. The tuples of current source 214$x$ and switch 220$x$, current source 216$x$ and switch 222$x$, and current source 218$x$ and switch 224$x$ are in parallel. The power supply 210$x$ is connected with the power pin input 204$x$ via line 205$x$, and can be connected to the analog to digital converter 212$x$ through anyone of the tuples of current source 214$x$ and switch 220$x$, current source 216$x$ and switch 222$x$, or current source 218$x$ and switch 224$x$. The thermistor reference input 206$x$ is connected to ground through resistor 233$x$. The ground reference input 209$x$ and analog to digital converter 212$x$ are connected to ground.

The analog to digital converter 212$x$ can be connected with the thermistor input 208$x$ via line 211$x$, which includes a switch 226$x$ and resistors 228$x$, 230$x$. The switch 226$x$ and resistors 228$x$, 230$x$ are arranged sequentially on the line 211$x$ such that the resistors 228$x$, 230$x$ are between the switch 220$x$ and switch 226$x$. A Zener diode 232$x$ is connected to the line 211$x$ between the resistors 228$x$, 230$x$ and resistor 233$x$.

As apparent to those of ordinary skill, the power supply 210$x$, analog to digital converter 212$x$, current sources 214$x$, 216$x$, 218$x$, and switches 220$x$, 222$x$, 224$x$ form a current source based thermistor interface circuit 234$x$ for the thermistor 120$x$. Such a feature can lead to increased accuracy in the thermistor interface circuit 234$x$ since the BMIC 202$x$ can automatically detect the optimal current to flow through the thermistor 120$x$ to optimize the signal to noise ratio, and achieve higher accuracy than traditional BMIC thermistor inputs.

Certain other BMICs merely provide an analog to digital input for the thermistor and expect the circuit designer to provide a pullup resistor to, for example, a +5V reference. In such implementations, the thermistor is part of a resistive divider. The divider provides a voltage at the BMIC input based on the thermistor temperature. For a more modern BMIC, such as the BMIC 202$x$, the BMIC 202$x$ selects one of the internally controlled current sources 214$x$, 216$x$, 218$x$ to put a test current through the thermistor 120$x$. This selected test current will cause a specific voltage to form across the thermistor 120$x$ according to Ohm's law (R×I=V). An alternative approach, however, could be an adjustable current source. In any case, the BMIC 202$x$ is selecting a test current source therein that flows through the thermistor 120$x$, which then causes a voltage across the thermistor 120$x$, which is then measured by the analog to digital converter 212$x$.

The BMIC 202$x$ with its test current source has different requirements than previous BMICs. The circuits corresponding to the current sources 214$x$, 216$x$, 218$x$ may have a lower absolute maximum rating than previous thermistor interfaces. For example, the BMIC 202$x$ may have an absolute maximum voltage rating of 2.5V, whereas previous BMICs may have an absolute maximum rating of 6V. Further, because of the nature of the controlled current sources 214$x$, 216$x$, 218$x$, the thermistor interface circuit 234$x$ may be intolerant of injection current. An injection current into a silicon die, for example on the BMIC 202$x$, is a current caused by an overvoltage condition on the external thermistor input 208$x$. In the vehicle 100, the BPSM 114$x$ may have thermistor wires in close proximity to the power pin input 204$x$ and ground reference input 209$x$. So, a short between a thermistor wire and one of the power pin input 204$x$ and ground reference input 209$x$ may develop in the corresponding battery array 112$x$. This short may cause a voltage, which can range from the full battery array voltage, or even a negative battery array voltage, since in a multi-BPSM array there can be a full array below the thermistor reference, if the thermistor interface is on the top BPSM of a two-BPSM array.

The switch 226$x$ could be, for example, a metal-oxide-semiconductor field-effect transistor. It is arranged in such a way that the gate of the switch 226$x$ will turn off if the voltage on the thermistor input 208$x$ rises higher than, for example, 2.5V. The gate, for example, may receive voltage data about the thermistor input 208$x$ from a corresponding voltage sensor, etc. The resistor 228$x$ and Zener diode 232$x$ account for very large input voltages that may cause avalanche in the switch 226$x$, which results from exceeding the voltage rating of the switch 226$x$. If this happens, the Zener diode 232$x$ will clamp at a certain voltage, for example 3V. The resistor 230$x$ is chosen to handle conditions when the Zener diode 232$x$ is at the clamp voltage. If a negative voltage is applied to the thermistor input 208$x$, the switch 226$x$ may conduct because of a body diode in the switch 226$x$. In such cases, the Zener diode 232$x$ will conduct. Whether an overvoltage or a negative input voltage occurs, in both cases the Zener diode 232$x$ will conduct enough current through the resistor 228$x$. The resistor 230$x$, however, will limit current into the BMIC 202$x$.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A traction battery system comprising:
    an array of battery cells;
    a temperature sensor configured to sense temperature of at least some of the battery cells; and
    a battery pack sensing module that includes a temperature sensor input connected with the temperature sensor, an integrated circuit configured to provide a selectable test current to the temperature sensor via the temperature sensor input, and a switch configured to disconnect the temperature sensor input from the integrated circuit responsive to a voltage on the temperature sensor input exceeding a predefined value.

2. The traction battery system of claim 1 further comprising a pair of resistors connected between the integrated circuit and switch.

3. The traction battery system of claim 2 further comprising a Zener diode connected between the pair of resistors and ground, and configured to clamp the voltage from the temperature sensor input to a second predefined value greater than the predefined value.

4. The traction battery system of claim 1, wherein the switch is a field effect transistor having a gate operationally responsive to the voltage.

5. The traction battery system of claim 4, wherein the field effect transistor is a metal-oxide-semiconductor field-effect transistor.

6. The traction battery system of claim 1, wherein the integrated circuit further includes a power supply, an analog to digital converter, and a plurality of current sources and switches connected between the power supply and analog to digital converter.

7. The traction battery system of claim 1, wherein the battery pack sensing module further includes a power input and wherein the integrated circuit includes a power supply connected with the power input.

8. A battery pack sensing module comprising:
    a temperature sensor input connected with a battery cell temperature sensor;
    an integrated circuit; and
    a field effect transistor connected between the temperature sensor input and the integrated circuit, and having a gate configured to selectively open based on a voltage on the temperature sensor input.

9. The battery pack sensing module of claim 8 further comprising a pair of resistors connected between the integrated circuit and the field effect transistor.

10. The battery pack sensing module of claim 9 further comprising a Zener diode connected between the pair of resistors and ground, and configured to clamp the voltage from the temperature sensor input to a predefined value.

11. The battery pack sensing module of claim 8, wherein the field effect transistor is a metal-oxide-semiconductor field-effect transistor.

12. The battery pack sensing module of claim 8, wherein the integrated circuit further includes a power supply, an analog to digital converter, and a plurality of current sources and switches connected between the power supply and analog to digital converter.

13. The battery pack sensing module of claim 8 further comprising a power input, wherein the integrated circuit includes a power supply connected with the power input.

14. A vehicle comprising:
    an electric machine; and
    a traction battery system configured to provide power to the electric machine, and including a temperature sensor and an integrated circuit, wherein the integrated circuit includes a plurality of current sources each configured to selectively provide a test current to the temperature sensor and a switch configured to disconnect the temperature sensor from the integrated circuit responsive to a voltage associated with the temperature sensor exceeding a predefined value.

15. The vehicle of claim 14, wherein the integrated circuit further includes a pair of resistors connected between the integrated circuit and the switch.

16. The vehicle of claim 15, wherein the integrated circuit further includes a Zener diode connected between the pair of resistors and ground, and configured to clamp the voltage to a second predefined value greater than the predefined value.

17. The vehicle of claim 14, wherein the switch is a field effect transistor having a gate operationally responsive to the voltage.

18. The vehicle of claim 14, wherein the integrated circuit further includes a power supply and an analog to digital converter, wherein the plurality of current sources are connected between the power supply and analog to digital converter.

* * * * *